July 19, 1955  F. D. McBRIDE  2,713,315
FLUX-CONTAINING WIRE SOLDER
Filed Aug. 16, 1952
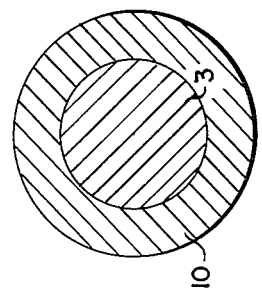
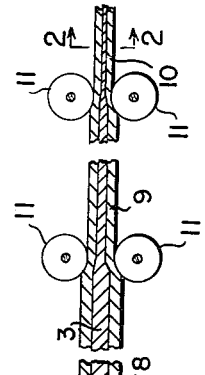
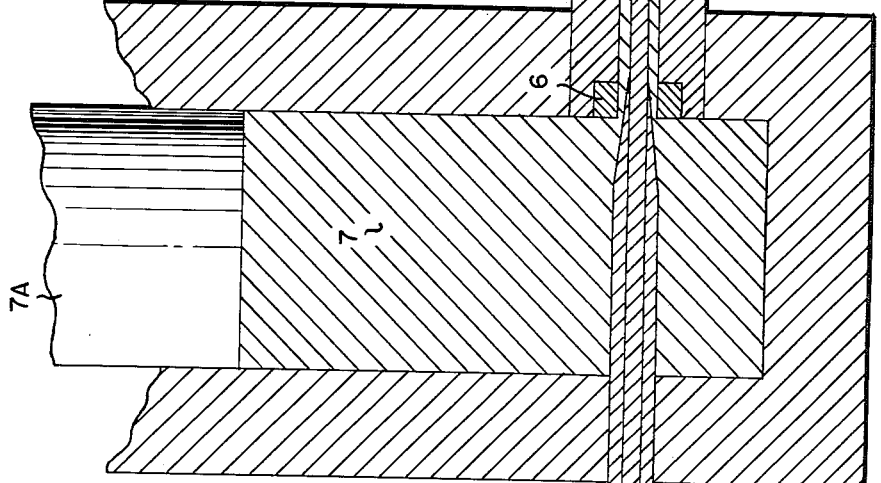
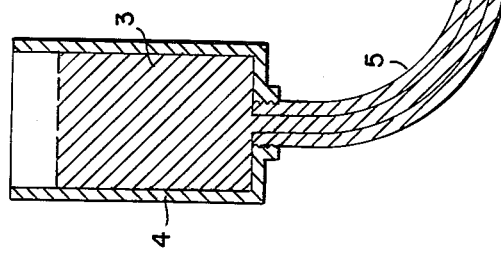
INVENTOR.
FRANK D. McBRIDE
BY
ATTORNEYS

2,713,315

FLUX-CONTAINING WIRE SOLDER

Frank D. McBride, Philadelphia, Pa.

Application August 16, 1952, Serial No. 304,708

2 Claims. (Cl. 113—110)

This invention relates to a refined wire solder or solder wire having a soldering flux incorporated as a core. More particularly, this invention refers to a combination solder wire and flux suitable for use in automatic soldering machines.

The solder wire and flux of this invention have particular utility in soldering the electrical contact of an electric lamp bulb to an aluminum base, the solder and flux in accordance with this invention being particularly effective for soldering on aluminum, although having utility for soldering on other metals as well.

There has long existed the problem of providing a small diameter solder wire suitable for use in automatic soldering machines for soldering electric lamp bulbs and yet which could be used to solder aluminum. The solder wire in accordance with this invention can readily be drawn to a diameter as small as .048", which is the smallest diameter presently being used in automatic soldering machines. Further, this wire can readily be provided with a bore adapted to contain flux of this invention.

There has further been the problem of obtaining a proper flux to promote the adherence of solder to aluminum. By this invention there is provided a solder-flux combination which results in a surprisingly ready adherence of the solder of this invention to aluminum.

It is believed that the major improvement in the solder of this invention stems from the use of tin-cadmium or tin-lead-cadmium solder in combination with a flux containing a cadmium or a cadmium-tin dust in addition to the other essential ingredients.

The solder in accordance with this invention comprises an alloy of tin and cadmium. The solder may also contain lead. The solder is drawn to form a hollow wire. The outside diameter of the wire is a matter of choice, but usually, if the wire is to be used with an automatic soldering machine for the soldering of electric lamp bulbs, it will have a diameter of from .048 to .072".

The solder will contain from 2 to 5% by weight of cadmium and 95 to 98% by weight of tin. 90% by weight of the tin can be substituted with lead.

The flux comprises a boron-fluorine addition compound of an amino alcohol or of a mixture of amino alcohols.

The amino alcohols which unite with the boron-fluorine compounds to form the essential ingredient of the soldering flux belong to the group of amines that contain a hydroxyl group attached to a carbon atom. There may also be more than one amine group in the molecule as in a diamine, triamine, etc., but as long as a hydroxyl group is present, the compound is regarded as being an amino alcohol. The amine group may or may not be connected with the carbon atom to which the hydroxyl group is attached. The amino alcohols that are useful for flux purposes also contain two or more carbon atoms, and preferably are derived from the class of alcohols known as the polyhydric alcohols, of which the glycols are specific examples.

Preferably, this addition compound will be a hydrofluoboric acid addition compound of triethanolamine. Hydrofluoboric acid addition compounds of other amino alcohols, such as monoethanolamine, diethanolamine, diethylaminoethanol, monoisopropanolamine, tri-isopropanolamine, hydroxyethyl ethylenediamine and phenol diethanolamine are illustrative of further satisfactory compounds.

By way of further example, boron trifluoride can be used instead of boron hydrofluoboric acid. The boron-fluorine addition compound will be present in an amount of from 15 to 35% by weight of the flux and preferably is made from equimolecular amounts of amino alcohol and boron-fluorine compound.

The amino alcohol addition compound may be dissolved in an excess of amino alcohol to facilitate formation of the flux.

The flux further contains zinc or tin fluoborate in an amount by weight of the flux of from 5 to 10% and polyethylene glycol in an amount by weight of the flux of from 5 to 15%.

The flux further contains metallic cadmium in the form of a dust or fine powder. The metallic dust or powder can also contain up to 90% by weight of the powder of tin dust or powder. The total metallic powder will be in an amount by weight of the flux of from .1% to 2%.

The ingredients of the flux are thoroughly admixed at room temperature.

The weight ratio of solder to flux is desirably in the range of from 99 to 1 to 94 to 6.

The invention will be further illustrated by the following specific examples:

Example 1

Hollow solder wire, .048" outside diameter:

| | Percent by weight |
|---|---|
| Tin | 95 |
| Cadmium | 5 |

Flux core:

| | Percent by weight |
|---|---|
| Hydrofluoric acid-diethanolamine addition compound (equimolecular amounts) | 35 |
| Tin fluoborate | 10 |
| Polyethylene glycol | 15 |
| Metallic cadmium dust (350 mesh) | 2 |
| Triethanolamine | 38 |

The ratio of the weight of the solder to flux was 97 to 3.

Example 2

Hollow solder wire, .058" outside diameter:

| | Percent by weight |
|---|---|
| Tin | 50 |
| Lead | 48 |
| Cadmium | 2 |

Flux core:

| | Percent by weight |
|---|---|
| Triethanolamine boron trifluoride (equimolecular proportions) | 20 |
| Zinc fluoborate | 5 |
| Polyethylene glycol | 10 |
| Tin-cadmium dust (80% tin, 20% cadmium by weight) (350 mesh) | .5 |
| Triethanolamine | 64.5 |

The ratio of the weight of the solder to flux was 98 to 2.

A typical method of making the solder wire-flux combination in accordance with this invention will be found on a reading of the following description in conjunction with the drawings in which:

Figure 1 illustrates a form of apparatus for use in making the solder wire-flux combination in accordance with this invention; and Figure 2 is a vertical section taken on the plane indicated by the line 2—2 in Figure 1.

As shown in Figure 1, a supply of flux 3 is held in a container 4. A tube 5 is connected to the bottom of container 4 and leads flux to a die 6 where the tube terminates.

The solder alloy 7 is extruded around tube 5 and through die 6 to form the hollow wire 8 about flux 3. The solder alloy is forced through die 6 by means of a plunger 7A. The wire 8 is further reduced to the diameter shown at 9 and the final desired diameter shown at 10 by means of rollers shown at 11.

As shown in Figure 2, the final wire 10 contains an inner core 3 of flux.

It is not desired to be limited except as set forth in the following claims, the above description being by way of illustration only.

What is claimed is:

1. A hollow solder wire consisting essentially of 2–5% by weight of cadmium, 9% by weight of tin and 86–89% by weight of a member selected from the group consisting of tin and lead, the hollow portion of said wire containing a flux consisting essentially of 15–35% by weight of a boron-fluorine addition compound of an amino alcohol, 5–10% by weight of a member selected from the group consisting of zinc and tin fluoborate, .1%–2% by weight of a member selected from the group consisting of cadmium dust and cadmium-tin dust having not less than 10% by weight of cadmium, from 5–15% by weight of polyethylene glycol and uncombined amino alcohol.

2. A hollow solder wire consisting essentially of 2–5% by weight of cadmium, 9% by weight of tin and 86–89% by weight of a member selected from the group consisting of tin and lead, the hollow portion of said wire containing a flux consisting essentially of 15–35% by weight of a hydrofluoboric acid addition compound of an amino alcohol, 5–10% by weight of a member selected from the group consisting of zinc and tin fluoborate, .1%–2% by weight of cadmium dust, from 5–15% by weight of polyethylene glycol and uncombined amino alcohol.

References Cited in the file of this patent

UNITED STATES PATENTS

| Number | Name | Date |
|---|---|---|
| 1,843,303 | Ripley | Feb. 2, 1932 |
| 1,891,546 | Krembs | Dec. 20, 1932 |
| 2,109,387 | Hanson et al. | Feb. 22, 1938 |
| 2,117,649 | Boyle | May 17, 1938 |
| 2,238,068 | Miller | Apr. 15, 1941 |
| 2,252,410 | Riesmeyer | Aug. 12, 1941 |
| 2,303,193 | Bouton et al. | Nov. 24, 1942 |
| 2,334,609 | Cox | Nov. 16, 1943 |
| 2,493,372 | Williams | Jan. 3, 1950 |